United States Patent
Hsieh

(10) Patent No.: US 9,917,873 B2
(45) Date of Patent: Mar. 13, 2018

(54) NETWORK-BASED PLAYBACK OF CONTENT IN CLOUD STORAGE BASED ON DEVICE PLAYBACK CAPABILITY

(71) Applicant: Cyberlink Corp., Shindian, Taipei (TW)

(72) Inventor: Kuo-Chiang Hsieh, New Taipei (TW)

(73) Assignee: CYBERLINK CORP., Shindian, Taipei (TW)

( * ) Notice: Subject to any disclaimer, the term of this patent is extended or adjusted under 35 U.S.C. 154(b) by 600 days.

(21) Appl. No.: 14/277,406

(22) Filed: May 14, 2014

(65) Prior Publication Data

US 2015/0106432 A1    Apr. 16, 2015

Related U.S. Application Data

(60) Provisional application No. 61/891,271, filed on Oct. 15, 2013.

(51) Int. Cl.
*H04L 29/06* (2006.01)
*G06F 9/50* (2006.01)

(52) U.S. Cl.
CPC .......... *H04L 65/602* (2013.01); *G06F 9/5055* (2013.01); *H04L 65/1073* (2013.01); *H04L 65/4084* (2013.01)

(58) Field of Classification Search
CPC .......... H04L 65/00–65/80; G06F 9/50–9/5061
See application file for complete search history.

(56) References Cited

U.S. PATENT DOCUMENTS

| | | | |
|---|---|---|---|
| 2002/0120721 A1* | 8/2002 | Eilers | G06F 17/30905 709/220 |
| 2003/0137449 A1* | 7/2003 | Vashisth | G01C 11/02 342/357.31 |
| 2005/0165913 A1* | 7/2005 | Coulombe | H04L 12/5835 709/219 |

(Continued)

FOREIGN PATENT DOCUMENTS

| | | |
|---|---|---|
| EP | 2528347 A1 | 11/2012 |
| WO | 2012/158807 A2 | 11/2012 |

OTHER PUBLICATIONS

Video Archiving and Transcoding System, www.viarchive.com, Feb. 11, 2011.

*Primary Examiner* — Clayton R Williams
(74) *Attorney, Agent, or Firm* — McClure, Qualey & Rodack, LLP

(57) ABSTRACT

A cloud computing device facilitates distribution of digital content by receiving multimedia content and a corresponding effect uploaded from a source device and storing the multimedia content with the corresponding effect, receiving an access request from a requesting device for the multimedia content, and determining whether the requesting device is a registered device. In response to the requesting device not being a registered device, the requesting device is registered and a registered device capabilities list is updated. A determination is made based on the registered device capabilities list on whether the requesting device is compatible with the multimedia content and effect. Based on a compatibility determination, data is transmitted to the requesting device to facilitate playback of the multimedia content and effect.

23 Claims, 9 Drawing Sheets

(56) References Cited

U.S. PATENT DOCUMENTS

| | | | |
|---|---|---|---|
| 2007/0183493 A1* | 8/2007 | Kimpe | G06F 21/6245 |
| | | | 375/240.1 |
| 2008/0220759 A1* | 9/2008 | Norrman | H04M 3/42136 |
| | | | 455/419 |
| 2008/0279535 A1* | 11/2008 | Haque | H04N 5/781 |
| | | | 386/244 |
| 2010/0020234 A1* | 1/2010 | Smith | H04N 5/445 |
| | | | 348/468 |
| 2011/0035466 A1* | 2/2011 | Panigrahi | H04N 21/222 |
| | | | 709/219 |
| 2011/0276881 A1* | 11/2011 | Keng | G11B 27/034 |
| | | | 715/723 |
| 2011/0311199 A1 | 12/2011 | Fay et al. | |
| 2012/0005302 A1* | 1/2012 | Chen | H04L 65/1016 |
| | | | 709/217 |
| 2012/0079600 A1 | 3/2012 | Kellerman et al. | |
| 2013/0111528 A1* | 5/2013 | Baskaran | H04N 21/25808 |
| | | | 725/61 |
| 2013/0145406 A1* | 6/2013 | Baskaran | H04N 21/2396 |
| | | | 725/87 |
| 2013/0325952 A1* | 12/2013 | Draznin | H04N 21/4126 |
| | | | 709/204 |
| 2014/0130106 A1* | 5/2014 | Syed | H04N 21/2343 |
| | | | 725/68 |

* cited by examiner

NETWORK-BASED PLAYBACK OF CONTENT IN CLOUD STORAGE BASED ON DEVICE PLAYBACK CAPABILITY

CROSS-REFERENCE TO RELATED APPLICATION

This application claims priority to, and the benefit of, U.S. Provisional Patent Application entitled, "Network-Based Playback of Content and Metadata in Cloud Storage Based on Device Playback Capability," having Ser. No. 61/891,271, filed on Oct. 15, 2013, which is incorporated by reference in its entirety.

BACKGROUND

Many users own multiple devices such as smartphones, tablets, and laptops that are capable of downloading digital content such as music, movies, images, and so on. As a result, users will many times upload their digital content to cloud storage for purposes of later accessing the content. However, issues arise when the user attempts to perform playback of media content stored in the cloud that is incompatible with the hardware and/or software of a particular device due to the encoding format of the digital content. This constraint may hinder a user's ability to access the user's entire collection of digital content and may limit the user's ability to experience such special effects as video subtitles or photo special effects.

SUMMARY

Briefly described, one embodiment, among others, is a method implemented in a cloud computing device for facilitating distribution of digital. The method comprises receiving multimedia content and a corresponding effect uploaded from a source device and storing the multimedia content with the corresponding effect, receiving an access request from a requesting device for the multimedia content, and determining whether the requesting device is a registered device. In response to the requesting device not being a registered device, information relating to hardware and software playback capabilities of the requesting device is obtained and the requesting device is registered. A registered device capabilities list with the hardware and software capabilities of the requesting device is updated. A determination is made, based on the registered device capabilities list, whether at least one of the hardware and software playback capabilities of the requesting device is compatible with the multimedia content and the effect. Based on the compatibility determination, data is transmitted to the requesting device to facilitate playback of the multimedia content with the effect incorporated.

Another embodiment is a cloud-based playback system that comprises at least one computing device including a processor and an application executable in the at least one computing device. The application comprises a device manager configured to receive information relating to hardware and software playback capabilities from each of a plurality of playback devices, the device manager being further configured to construct a device capabilities list, wherein the device capability list is based on the hardware and software playback capabilities. The application further comprises a device interface configured to receive multimedia content and a corresponding effect uploaded from a source device and store the multimedia content and the corresponding effect and an analyzer configured to identify registered devices compatible with the received multimedia content based on the device capabilities list when a requesting device requests access to the multimedia content. The application further comprises a content distributor configured to transmit the data to the requesting device based on the identification of registered devices compatible with the received multimedia content, wherein the data facilitates playback of the multimedia content with the effect incorporated.

Another embodiment is a method implemented in a cloud computing device for facilitating distribution of digital. The method comprises receiving information relating to playback capability from a plurality of playback devices communicatively coupled to the cloud computing device, registering each of the playback devices and constructing a device capabilities list, and receiving multimedia content and a corresponding effect uploaded from a source device and storing the multimedia content and the corresponding effect. The method further comprises determining a file format of the multimedia content, receiving an access request from one of the registered playback devices, and in response to the playback capability of the requesting playback device being incompatible with the format of the multimedia content, transmitting a transcoded version of the multimedia content with the effect incorporated to the requesting playback device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
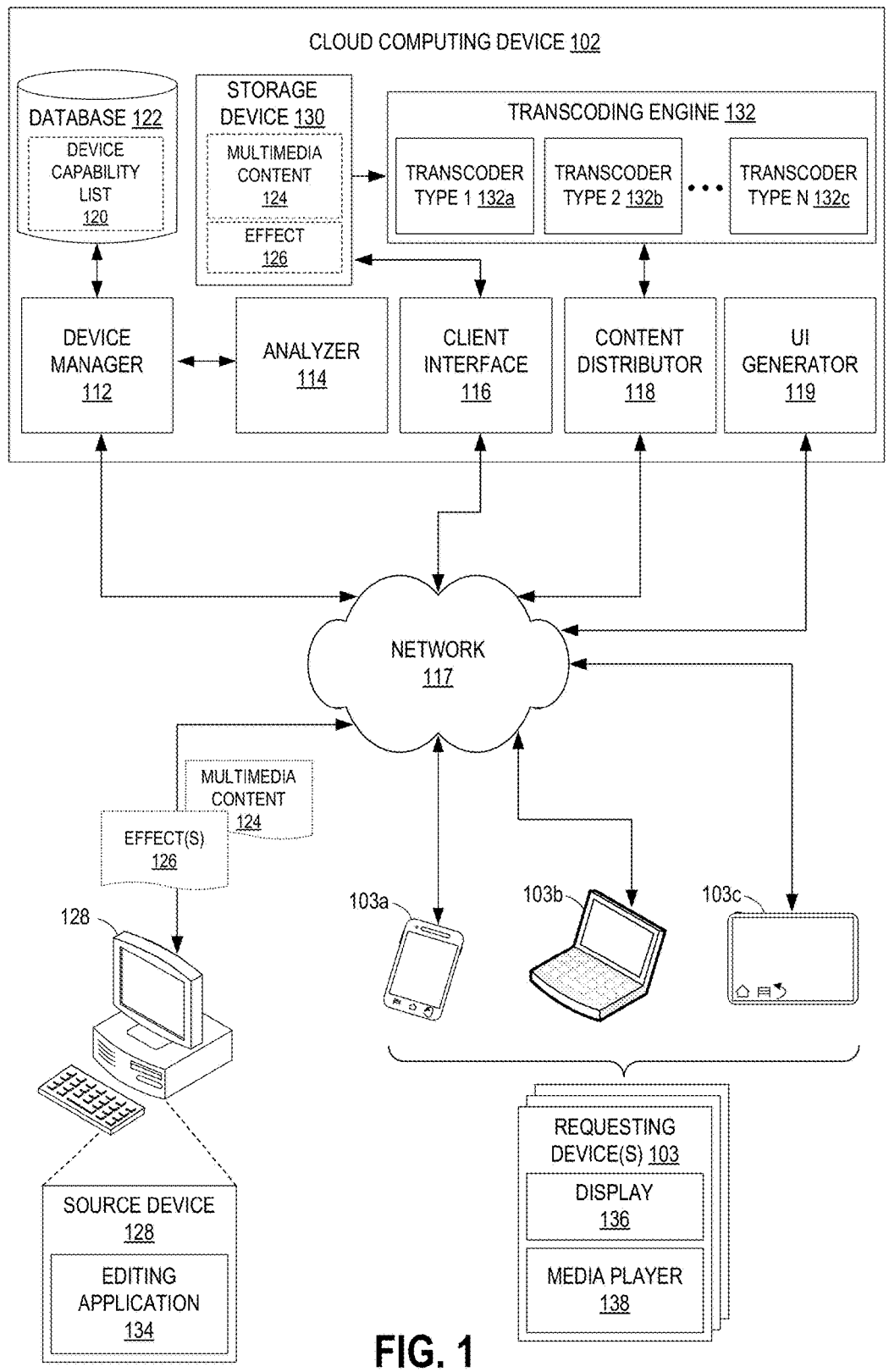
FIG. 1 is a block diagram of a networked environment in which embodiments of a cloud computing device may be implemented in accordance with various embodiments of the present disclosure.

As discussed above, users will many times upload digital content to cloud storage for purposes of later accessing the content via a device such as a smartphone or tablet computing device. However, issues arise when the user attempts to perform playback of media content stored in the cloud that is incompatible with the hardware and/or software of a particular device due to the encoding format of the digital content. Although installing the proper software and/or hardware is one possible solution, this can be tedious and time-consuming, particularly if the user has to perform this for each device.

Various embodiments are disclosed for bridging cloud storage capabilities with a user's devices where the cloud storage environment "learns" the user's devices. For some embodiments, after the user uploads multimedia content to the cloud, the cloud determines whether transcoding is needed based on the effect uploaded with the multimedia content and based on a requesting device's playback capabilities. For various embodiments, only the original, unmodified version of the multimedia file and the related effect needs to be stored in the cloud.

With the cloud computing system disclosed, different versions of the multimedia file may be distributed to different devices with special effects incorporated, where the content is tailored according to the respective playback capabilities of each device. As a result, multiple devices are able to access various file playback features including external data (e.g., external subtitles) and/or special effects (e.g., video editing effects) regardless of the playback capabilities of each device. Furthermore, the cloud computing system disclosed provides for seamless access to multimedia content without the need to install software and/or hardware to ensure device compatibility with a particular multimedia format.

In accordance with some embodiments, a cloud-based environment is implemented for linking shared files and effects with various devices, where the cloud-based environment comprises at least one device and a cloud computing device. The cloud computing device registers the corresponding playback capabilities of the device(s) with the cloud server and a device ability list is generated and stored. User-specified local playback effects and external file data are logged and an effect is generated, where the external data and/or special effects are specified or stored within the effect. A device then uploads the original media content and the corresponding effect to the cloud server.

Other devices may then select one of the special effects specified in the effect of the original media content for playback purposes. Note that playback of media content may include playback of audio content, video content, and digital images. Based on the device capability, a compatible multimedia format is determined by the cloud server by accessing the stored device ability list and the effect. Note that for some embodiments, a device other than the cloud server may perform the appropriate transcoding operation needed for transmitting the media content with the selected special effect to the device requesting playback. For example, an early uploading stage outside of the cloud may determine and apply the transcoding rule to be utilized. A description of a system for facilitating digital content distribution is now described followed by a discussion of the operation of the components within the system.

FIG. 1 is a block diagram of a networked environment in which embodiments of a cloud computing device 102 may be implemented. The cloud computing device 102 may be embodied, for example, as a server computer or any other system providing computing capability. Alternatively, the cloud computing device 102 may include a plurality of computing devices that are arranged, for example, in one or more server banks or computer banks or other arrangements. For example, a plurality of computing devices together may collectively comprise a cloud computing resource and/or any other distributed computing arrangement. Such computing devices may be located in a single installation or may be distributed among different geographical locations.

The components executed on the cloud computing device 102 may include, for example, a device manager 112, an analyzer 114, a client interface 116, and a content distributor 118. The device manager 112 is executed to receive information relating to media reproduction or playback capabilities from a plurality of devices 103a, 103b, 103c communicatively coupled to the cloud computing device 102 via a network 117. The network 117 may include, for example, the Internet, intranets, extranets, wide area networks (WANs), local area networks (LANs), wired networks, wireless networks, or other suitable networks, etc., or any combination of two or more such networks.

The device manager 112 is further configured to register each of the devices 103a, 103b, 103c and construct a device capabilities list 120, which is stored in a database 122 maintained by the cloud computing device 102. Note that the database 122 may be representative of a plurality of databases as can be appreciated.

The analyzer 114 is executed to determine a compatible multimedia format for each of the registered playback devices 103a, 103b, 103c based on the device capabilities list 120 stored in the database 122. The client interface 116 is executed to receive multimedia content 124 and corresponding effect 126 uploaded from a source device 128 via the network 117 and to store the multimedia content 124 and the corresponding effect 126 in a storage device 130 in the cloud computing device 102. The storage device 130 further comprises a plurality of software components.

The content distributor 118 is executed to transmit multimedia content to a requesting device in response to an access request from one of the registered devices 103a, 103b, 103c. Depending on data in the device capability list 120 corresponding to the requesting device 103a, 103b, 103c, a transcoding engine 132 within the cloud computing device 102 transcodes the multimedia content 124 uploaded by the source device 128 and stored in the storage device 130 according to a multimedia format compatible with the requesting device 103a, 103b, 103c. For some embodiments, the transcoding engine 132 may also simultaneously transmit and transcode the multimedia content 124 to the requesting devices 103a, 103b, or 103c. The content distributor 118 may then download or stream the transcoded multimedia content with effect 126 incorporated to the requesting device 103a, 103b, 103c. As described below, for some embodiments, the transcoding engine 132 shown in FIG. 1 may be implemented external to the cloud computing device 102. For example, the transcoding engine 132 may be implemented in the source device 128.

The source device 128 may comprise a processor-based system such as a computer system, where the computer system may be embodied in the form of a desktop computer, a laptop computer, a smartphone, a tablet computing device, and so on. The source device 128 may be configured to execute various applications such as an editing application 134, a playback application, a photo preview application and/or other applications. The editing application 134 is executed to incorporate user-specified playback effects into multimedia content 124 such as video, where the user-specified playback may comprise such special effects as customized text/subtitles, graphics, and/or other audio/video content. Other playback effects include a preview of the multimedia content 124 such as photos. Yet other playback effects may include such digital imaging effects as whitening effects, smoothing effects, picture-in-picture (PIP) effects, coloring effects, lighting effects, contrast adjustment, and so on.

For some embodiments, the editing application 134 generates a project file embodied as an effect, where the effect specifies the user-specific playback effects. For example, the effect may contain subtitles where the subtitles are later embedded within the multimedia content or sent separately from the multimedia content by the content distributor 118 in the cloud computing device 102 to a requesting device 103a, 103b, 103c. It should be emphasized that the multimedia content is left in its original state (i.e., unmodified) when uploaded by the source device 128 to the cloud computing device 102, where the playback effects are later incorporated into the multimedia content that is downloaded or streamed to a requesting device 103a, 103b, 103c.

As one of ordinary skill will appreciate, the multimedia content 124 processed by the editing application 134 may be encoded in any of a number of formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), MPEG-4 (MP4), Matroska (MKV), or any number of other digital formats. The multimedia content may be encoded in other formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files, and so on.

The user of the source device 128 may elect to incorporate different playback effects for different multimedia formats. For example, the user may edit the multimedia content such that a different color level is incorporated for different image file formats (e.g., JPEG, BMP), where the different color levels are specified in the effect 126. Where a requesting device 103a, 103b, 103c is compatible with more than one multimedia format, the different special effects may then be selectable by a requesting device 103a, 103b, 103c. In this regard, the cloud computing device may further comprise a user interface (UI) generator 119 configured to generate a user interface comprising at least one selectable playback effect. In particular, the UI generator 119 may be executed to generate user interface data sent to the various devices 103a, 103b, 103c, where the user interface data may be embodied, for example, as web pages, portions of web pages, data used to configure or populate mobile application displays, and or other data.

Each requesting device 103 may be embodied, for example, as a desktop computer, computer workstation, a smartphone, a laptop, a tablet computing device, or other computing platform and includes a display 136. For embodiments where the requesting device 103 is embodied as a smartphone or tablet, the user may interface with the requesting device 103 via a touchscreen interface. The requesting device 103 may be configured to transmit an access request to the client interface 116 in the cloud computing device 102, where the access request is generated based on user interface data generated by the UI generator 119.

Figure 2:
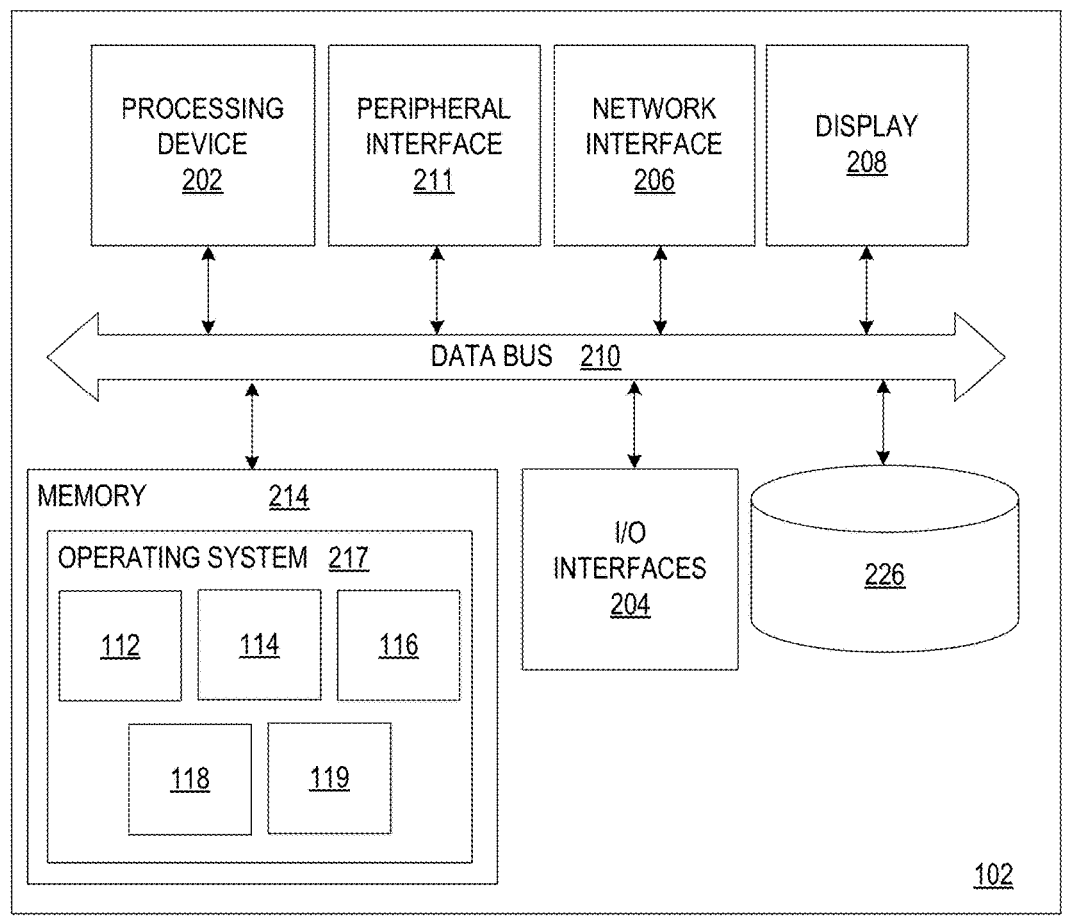
FIG. 2 is a detailed view of the cloud computing device of FIG. 1 in accordance with various embodiments of the present disclosure.

FIG. 2 is a schematic diagram of the cloud computing device 102 shown in FIG. 1. The cloud computing device 102 may be embodied in any one of a wide variety of computing devices, such as a dedicated server computer, multiprocessor computing device, and so forth. As shown in FIG. 2, the cloud computing device 102 comprises memory 214, a processing device 202, a number of input/output interfaces 204, a network interface 206, a display 208, a peripheral interface 211, and mass storage 226, wherein each of these devices are connected across a local data bus 210.

The processing device 202 may include any custom made or commercially available processor, a central processing unit (CPU) or an auxiliary processor among several processors associated with the cloud computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (device manager 112, analyzer 114, client interface 116, content distributor 118, UI generator 119) of the cloud computing device 102 depicted in FIG. 2. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the cloud computing device 102 comprises a personal computer, these components may interface with one or more user input devices via the I/O interfaces 204, where the user input devices may comprise a keyboard or a mouse. The display 208 may comprise a computer monitor, a plasma screen for a PC, a liquid crystal display (LCD), a touchscreen display, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The cloud computing device 102 may communicate with one or more computing devices via the network interface 206 over the network 117 (FIG. 1). The cloud computing device 102 may further comprise mass storage 226.

Figure 3:
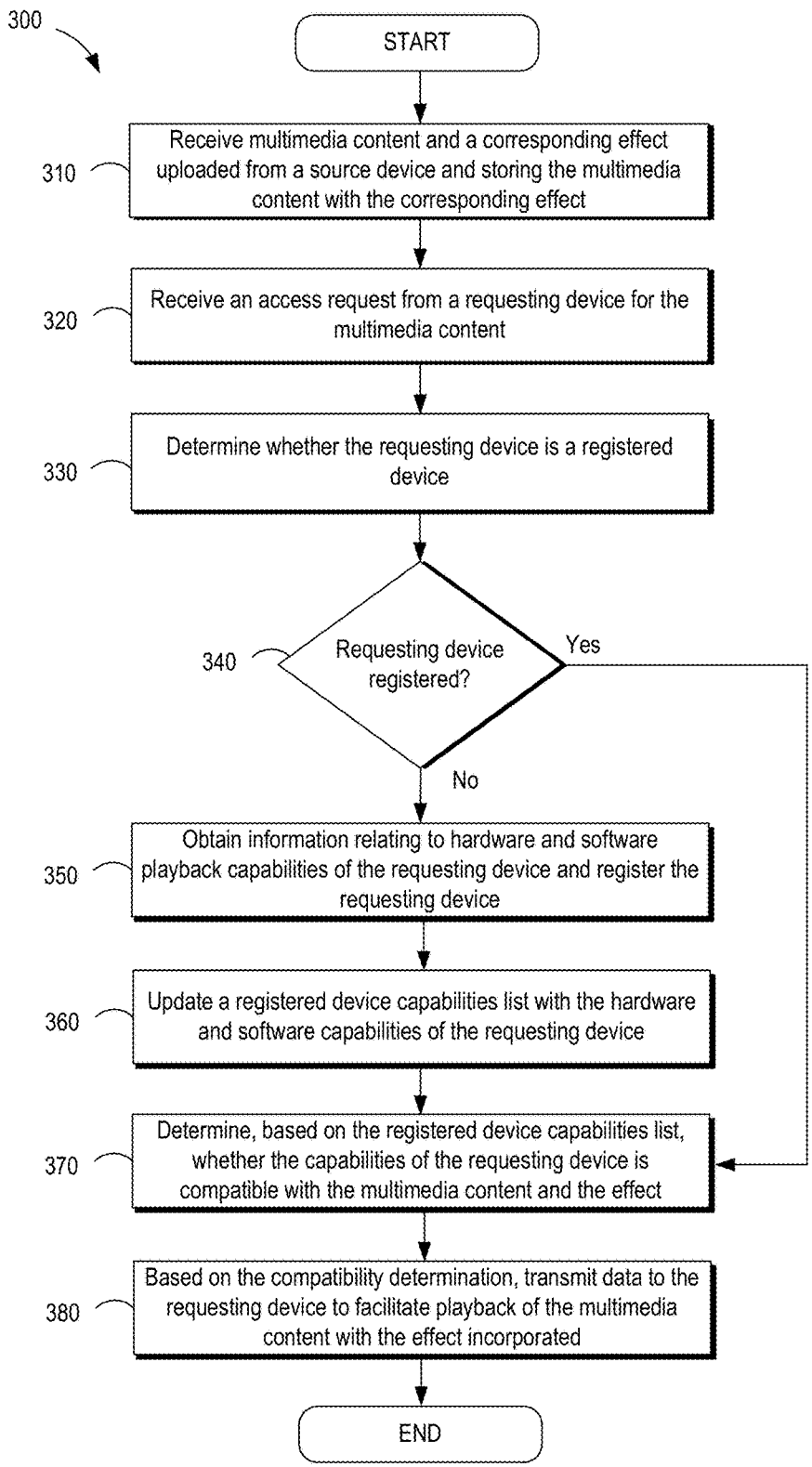
FIG. 3 is a top-level flowchart illustrating an example of functionality implemented as portions of the cloud computing device of FIG. 1 for facilitating digital content distribution according to various embodiments of the present disclosure.

Reference is made to FIG. 3, which is a flowchart 300 in accordance with one embodiment for facilitating content distribution. It is understood that the flowchart 300 of FIG. 3 provides merely an example of the many different types of functional arrangements that may be employed to implement the operation of the various components of the cloud computing device 102 (FIG. 1). As an alternative, the flowchart of FIG. 3 may be viewed as depicting an example of steps of a method implemented in the cloud computing device 102 according to one or more embodiments.

Beginning with block 310, the client interface 116 (FIG. 1) receives multimedia content 124 (FIG. 1) and a corresponding effect 126 (FIG. 1) from a source device 128 (FIG. 1) and stores the multimedia content 124 with the corresponding effect 126. In block 320, the content distributor 118 (FIG. 1) receives an access request from a requesting device 103 (FIG. 1) for the multimedia content 124. In block 330, the device manager 112 (FIG. 1) determines whether the requesting device 103 is a registered device. In decision block 340, if the requesting device 103 is not a registered device, then flow proceeds to block 350, where information relating to the hardware and software playback capabilities of the requesting device 103 is obtained by the device manager 112, and the requesting device 103 is registered. In block 360, the device manager 112 updates the device capability list 120 (FIG. 1). In block 370, the analyzer 114 (FIG. 1) determines whether the capabilities of the requesting device 103 are compatible with the multimedia content 124 and effect 126 based on the device capabilities list 120. In block 380, the content distributor 118 transmits data to the requesting device 103 to facilitate playback of the multimedia content 124 with the effect 126 incorporated. Referring back to the decision block 340, if the requesting device is already registered, then flow proceeds to block 370, and the operations described above are performed.

Figure 4:
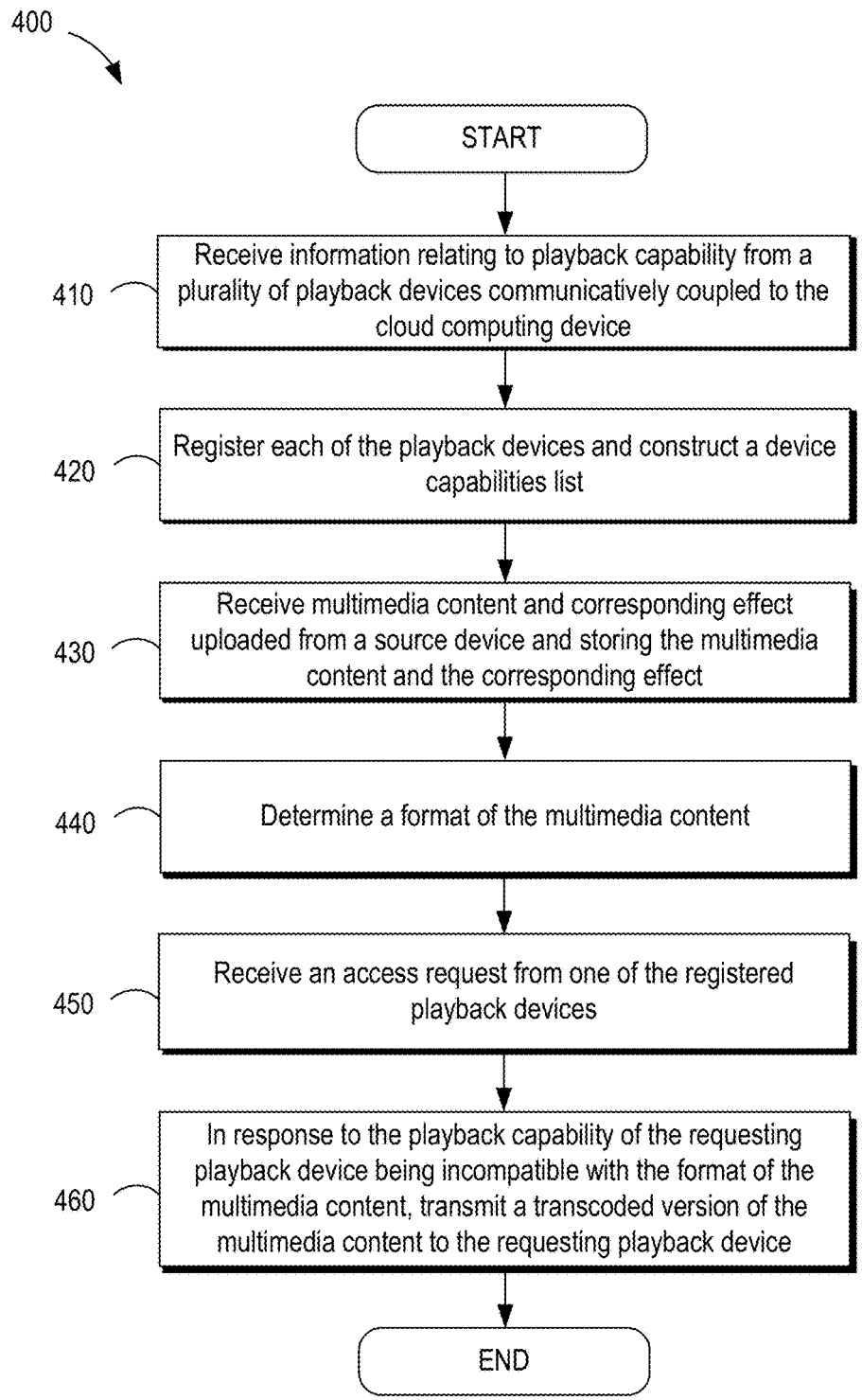
FIG. 4 is a top-level flowchart illustrating another example of functionality implemented as portions of the cloud computing device of FIG. 1 for facilitating digital content distribution according to various embodiments of the present disclosure.

Reference is made to FIG. 4, which is a flowchart 400 in accordance with an alternative embodiment for facilitating content distribution. It is understood that the flowchart 400 of FIG. 4 provides merely an example of the many different types of functional arrangements that may be employed to implement the operation of the various components of the cloud computing device 102 (FIG. 1). As an alternative, the flowchart of FIG. 4 may be viewed as depicting an example of steps of a method implemented in the cloud computing device 102 according to one or more embodiments.

Beginning with block 410, the device manager 112 (FIG. 1) receives information relating to playback capability from a plurality of playback devices communicatively coupled to the cloud computing device 102. In block 420, the device manager 112 registers each of the playback devices and constructs a device capabilities list 120. In block 430, the client interface 116 (FIG. 1) receives multimedia content 124 and a corresponding effect 126 uploaded from a source device 128 (FIG. 1) and stores the multimedia content 124 and the corresponding effect 126.

In block 440, the analyzer 114 determines a format of the multimedia content 124. In block 450, the content distributor 118 (FIG. 1) receives an access request from one of the registered playback devices 103 (FIG. 1). In block 460, in response to the playback capability of the requesting playback device being incompatible with the format of the multimedia content, the content distributor 118 transmits a transcoded version of the multimedia content to the requesting playback device 103.

Figure 5:
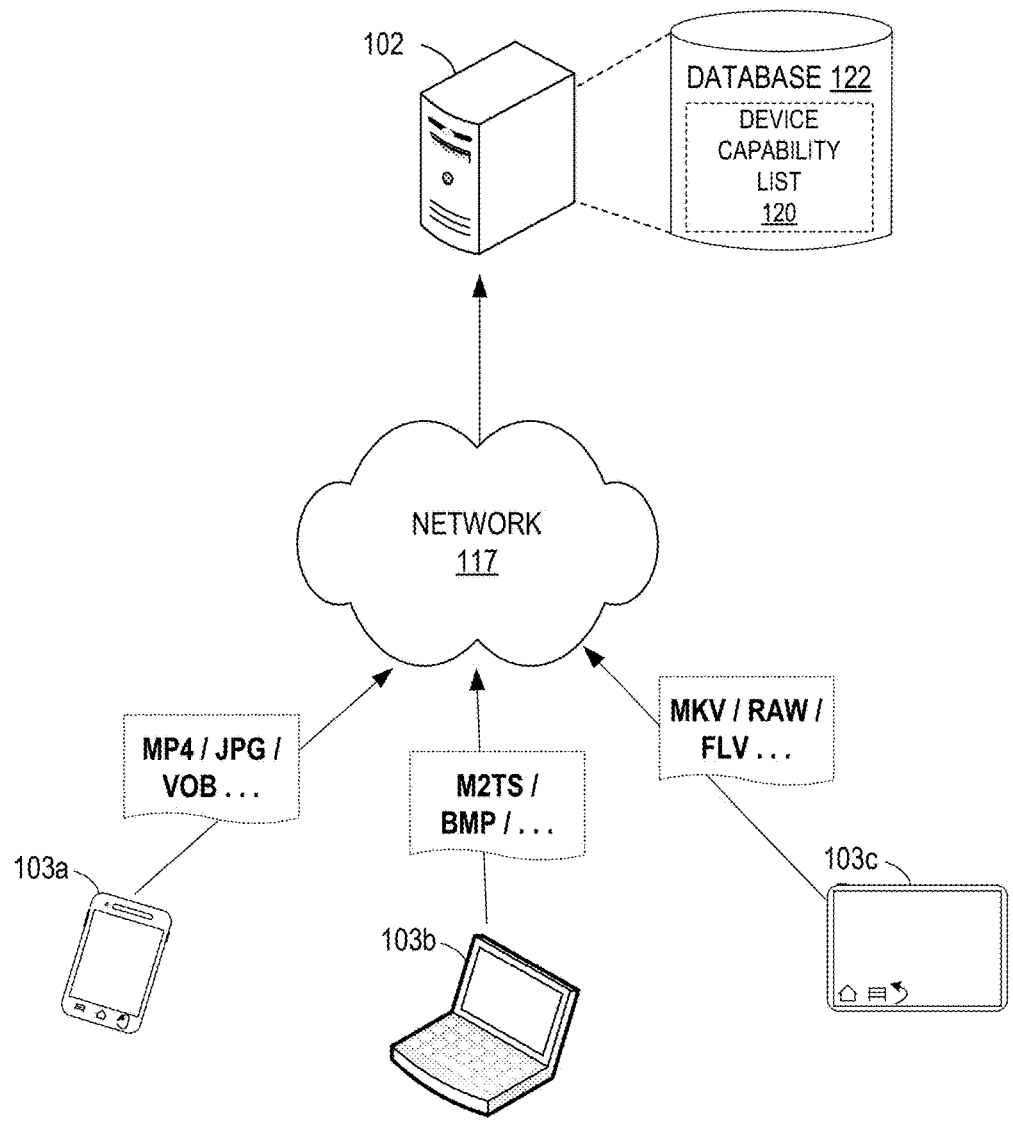
FIG. 5 illustrates the registration process performed by the cloud computing device of FIG. 1 according to various embodiments of the present disclosure.

To further illustrate various aspects of digital content distribution as disclosed herein, reference is made to FIG. 5, which illustrates the registration process performed by the cloud computing device 102. As described earlier, a user may wish to access digital content with any number of devices 103a, 103b, 103c. In order to access the full collection of digital content in cloud storage, each of the devices 103a, 103b, 103c is registered with the cloud computing device 102. In particular, the respective playback capabilities of each device 103a, 103b, 103c are received by the cloud computing device 102. For some embodiments, a new device submits a registration request to the cloud computing device 102, which then requests information relating to software and/or hardware capabilities of the new device. For example, the cloud computing device 102 may determine the codec(s) and/or player application(s) installed on the new device. The cloud computing device 102 may also determine which file formats are supported by the new device.

A device capability list 120 is generated that links each device 103a, 103b, 103c with its respective playback capability, and the device capability list 120 is maintained by the cloud computing device 102. Thus, if new software is installed on a particular device that allows the device to support additional file formats, the cloud computing device 102 automatically updates the device capability list 120. For some embodiments, the cloud computing device 102 may periodically retrieve playback capability information from each device. Alternatively, the cloud computing device 102 may retrieve playback capability information whenever a device requests access to stored content. For example, if the first device 103a submits an access request to the cloud computing device 102, the device manager 112 may be configured to automatically check the status of all the devices 103a, 103b, 103c registered with the cloud computing device 102.

Note that the playback capability may specify which multimedia formats the device 103a, 103b, 103c are compatible with from a software and/or hardware perspective. For example, the device capability list 120 may list the type of codec(s) and/or media player application that is installed on each device 103a, 103b, 103c. In the example shown, the cloud computing device 102 receives data from each of the devices 103a, 103b, 103c. The first device 103a is capable of processing MPEG-4 (MP4), JPEG (JPG), and Video Object (VOB) files, while the second device 103b is capable of processing MPEG-2 Transport Stream (M2TS) and bitmap (BMP) files.

Figure 6:
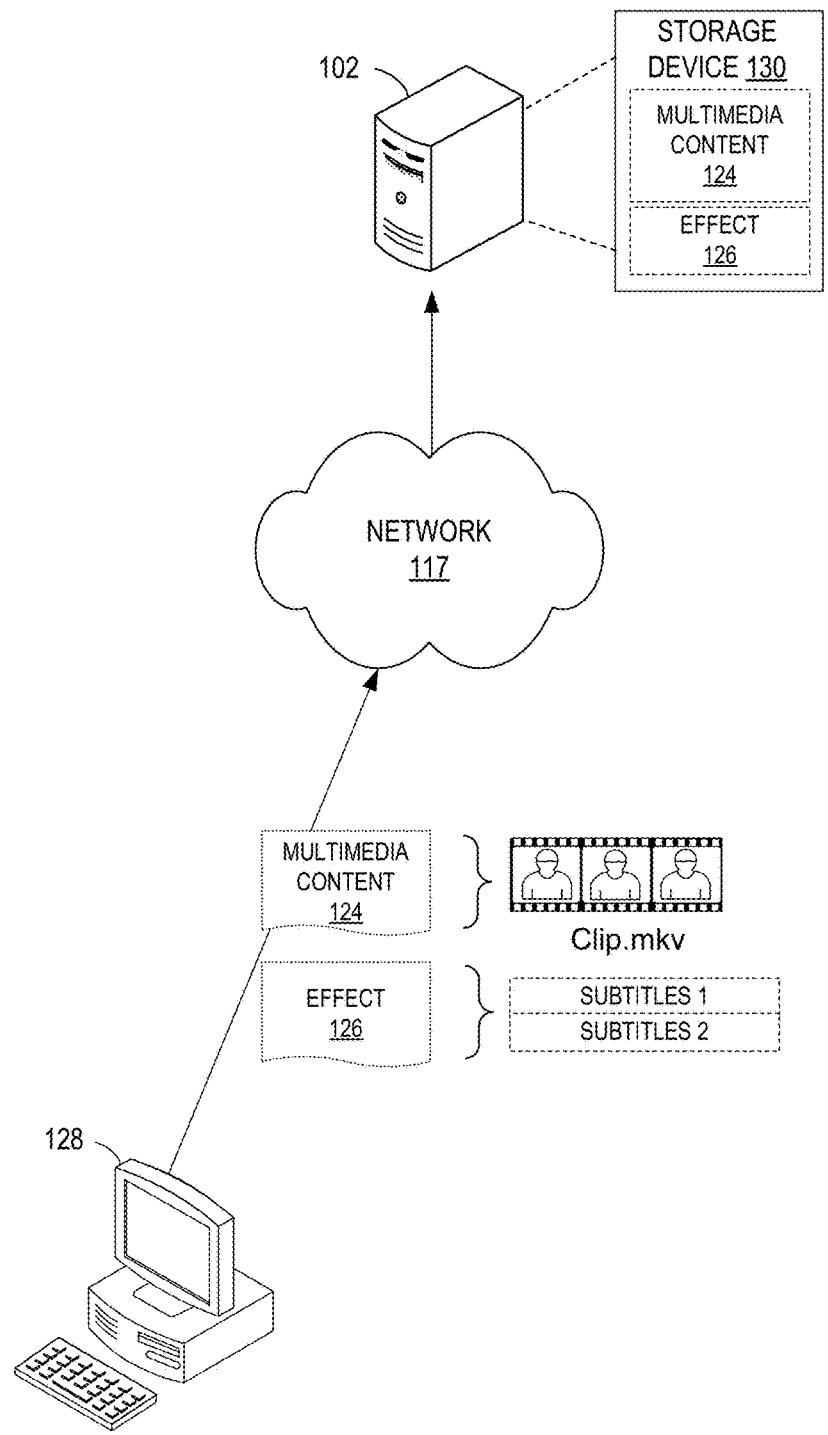
FIG. 6 illustrates a source device uploading digital content to the cloud computing device of FIG. 1 according to various embodiments of the present disclosure.

Reference is made to FIG. 6, which illustrates a source device 128 uploading digital content to the cloud computing device 102 for backup purposes and/or distribution purposes. In some cases, the user of the source device 128 may elect to incorporate different playback effects for different multimedia formats. As an example, the user may wish to incorporate a different preview clip for different file formats.

Figure 7:
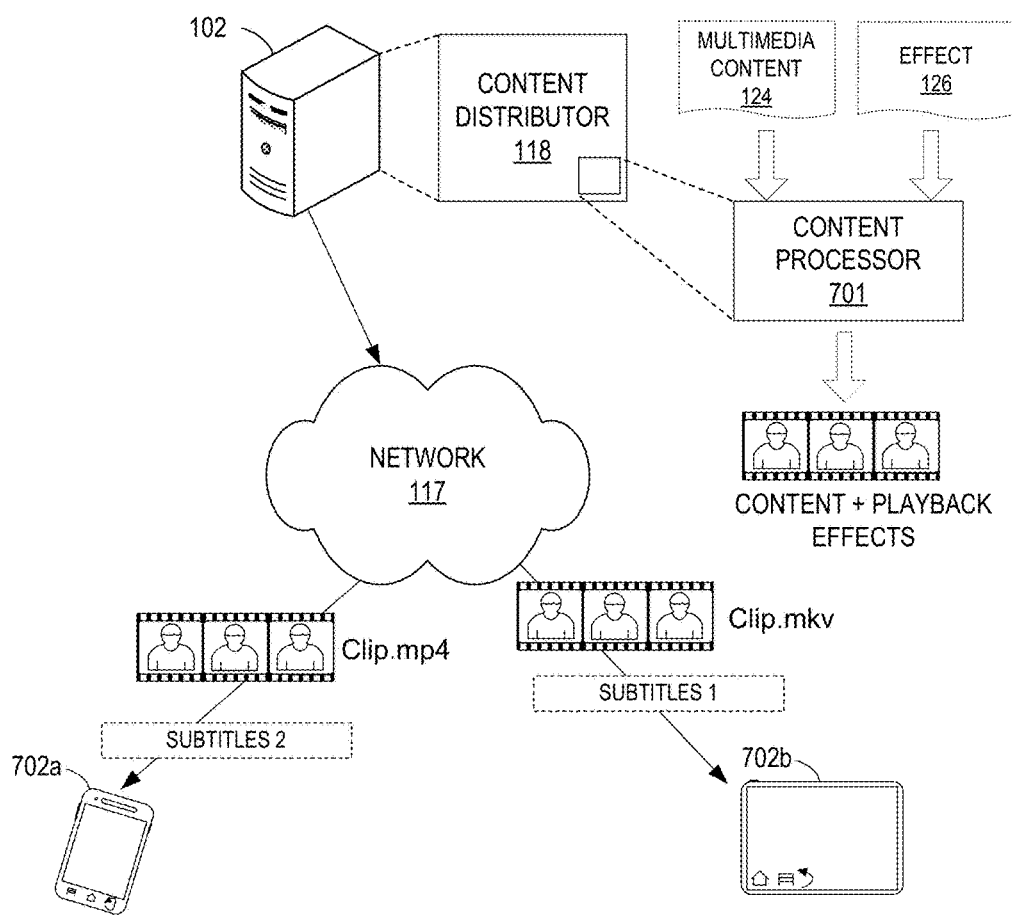
FIG. 7 illustrates distribution of digital content by the cloud computing device of FIG. 1 to various requesting devices according to various embodiments of the present disclosure.

FIG. 7 illustrates distribution of content by the cloud computing device 102 to various requesting devices 103a, 103c. With reference back to the example shown in FIG. 6, the source device 128 uploads multimedia content 124 (FIG. 6) that comprises a video clip encoded in the MKV format. The corresponding effect 126 (FIG. 6) comprises multiple sets of subtitles for different language and subtitle formats such as but not limited to the SubRip Text (SRT) and Advance Substation Alpha (ASS) formats. Note that the formats of the subtitles are not necessarily related to the format of the video. Referring back to FIG. 7, the first requesting device 702a is capable of processing MP4 files and therefore receives a version of the uploaded video clip transcoded in the MP4 format. Furthermore, the first requesting device 702a receives the set of subtitles (i.e., Subtitles 2). Similarly, the second requesting device 702b receives the set of subtitles (i.e., Subtitles 1).

In accordance with various embodiments, the different versions of the original video clip (i.e., video.mkv) are transmitted by the cloud computing device 102 to the respective devices 702a, 702b. In the embodiment illustrated, the content distributor 118 further comprises a content processor 701 that receives the unmodified multimedia content 124 and the effect 126 stored in the cloud computing device 102. Based on the playback effects specified in the effect 126, the content processor 701 generates a modified version of the multimedia content with the playback effects incorporated. This modified version is then downloaded or streamed to the requesting devices 702a, 702b.

Figure 8:
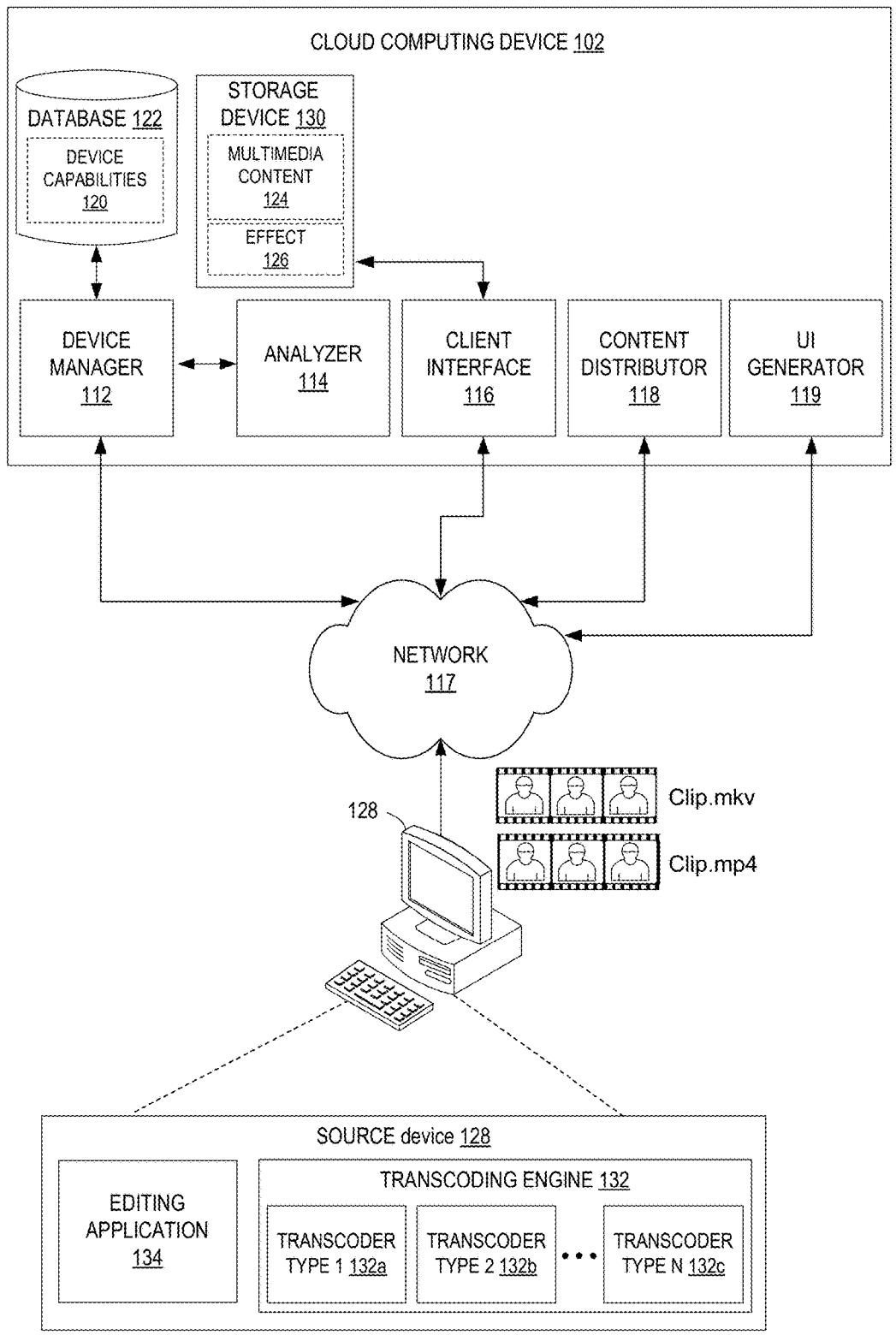
FIG. 8 is a block diagram of a networked environment in which alternative embodiments of the cloud computing device may be implemented.

For some embodiments such as the configuration shown in FIG. 1, the cloud computing device 102 includes a transcoding engine 132 (FIG. 1) configured to transcode the uploaded multimedia content 124 as needed. For some embodiments, transcoding of the multimedia content 124 is performed external to the cloud computing device 102. FIG. 8 illustrates an embodiment where transcoding is performed by the source device 128. As shown, the source device 128 includes a transcoding engine 132, which further comprises various transcoder types 132 for generating multimedia content of different file formats. In accordance with such embodiments, the source device 128 may upload multiple versions of the same multimedia content, where the versions correspond to different formats.

If a particular device supports a file format than the file format of the stored multimedia content 124, the content distributor 118 in the cloud computing device 102 may be configured to transmit a transcoding request to the source device 128. In response, the source device 128 transcodes the multimedia content and generates a modified version of the multimedia content with the playback effects specified in the effect 126 incorporated. The modified version of the multimedia content is uploaded to the cloud computing device 102, and the content distributor 118 then forwards the modified version of the multimedia content to the requesting device.

Figure 9:
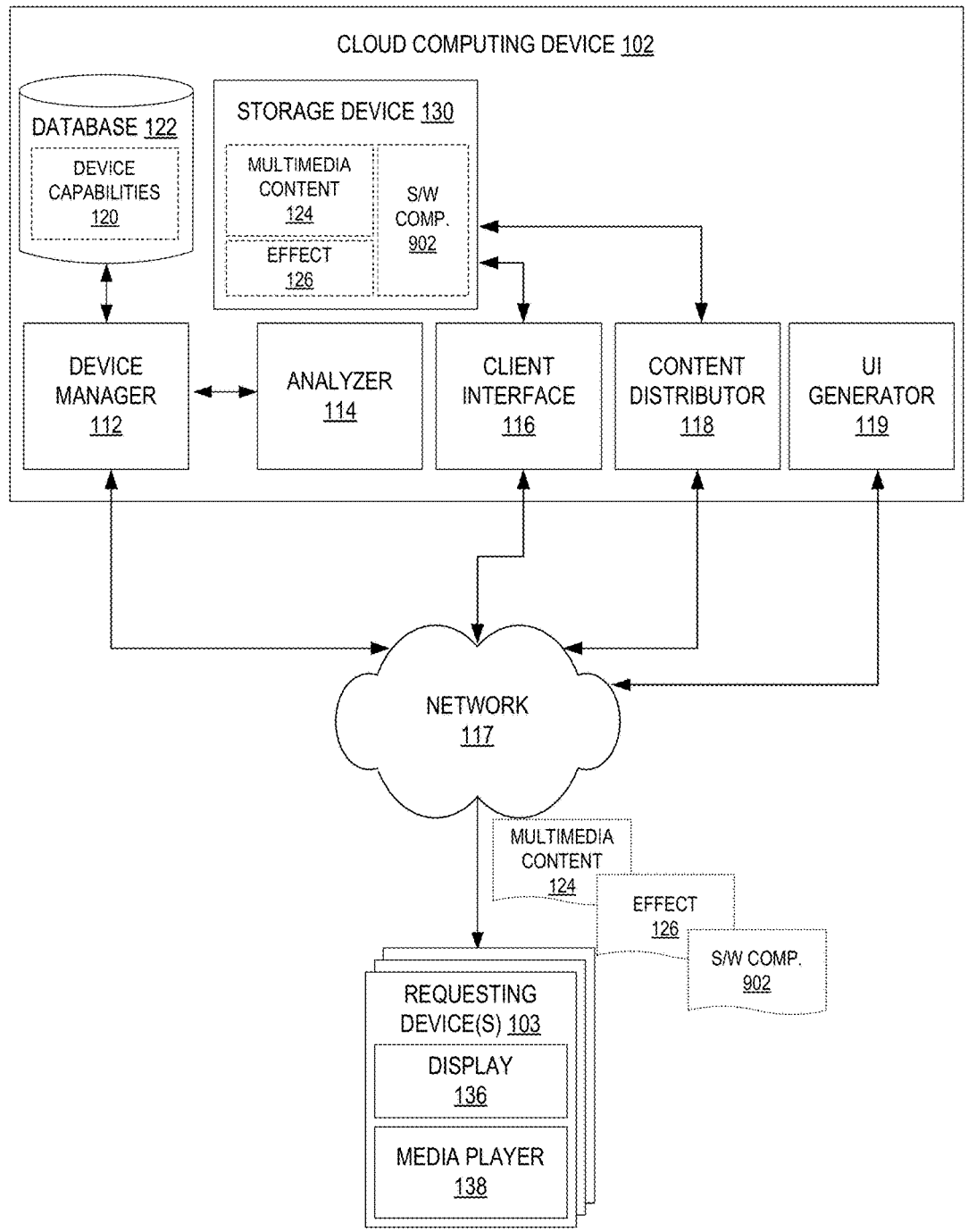
FIG. 9 is a block diagram of a networked environment in which an alternative embodiment of a cloud computing device may be implemented.

FIG. 9 is a block diagram of a networked environment in which an alternative embodiment of a cloud computing device 102 may be implemented. For some embodiments, the storage device 130 in the cloud computing device 102 stores one or more software components 902 that may be transmitted with multimedia content 124 to a requesting device 103 when the playback capabilities of the requesting device 103 is incompatible with the format of the multimedia content 124. In accordance with such embodiments, the software component 902 is executed by the requesting device 103 and facilitates playback of the multimedia content 124. For some embodiments, the software component 902 may be used in conjunction with the media player 138 executed on the requesting device 103. In this regard, the data transmitted by the content distributor 118 in the cloud computing device 102 may comprise the multimedia content 124 with a user-specified effect incorporated and one or more software components 902.

For various embodiments, the software component may comprise a segment of code, a format or effect-specific plug-in, a software upgrade, a software patch, a software application, and so on. Consider for illustration purposes a base version of a software application that is only capable of performing playback of five effects. Suppose that the requesting device requests playback access to multimedia content with a sixth effect that is not currently supported by the requesting device. In this scenario, the cloud computing device 102 transmits a suitable software component to the requesting device 103 to facilitate playback of the multimedia content. Upon executing the software component on the requesting device 103, the requesting device performs playback of the content with the desired sixth effect.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a cloud computing device for facilitating distribution of digital content, comprising:
  receiving multimedia content and a corresponding effect uploaded from a source device and storing the multimedia content with the corresponding effect;
  receiving an access request from a requesting device for the multimedia content;
  determining whether the requesting device is a registered device;
  responsive to the requesting device not being a registered device, performing the steps of:
    obtaining information relating to hardware and software playback capabilities of the requesting device and registering the requesting device; and
    updating a registered device capabilities list with the hardware and software capabilities of the requesting device;
  determining, based on the registered device capabilities list, whether at least one of the hardware and software playback capabilities of the requesting device is compatible with the multimedia content and the effect;
  based on the compatibility determination, transmitting data to the requesting device to facilitate playback of the multimedia content with the effect incorporated, wherein the data comprises the multimedia content with the effect incorporated and one or more software components executable on the requesting device, the one or more software components expanding the at least one of the hardware and software playback capabilities of the requesting device with respect to both the multimedia content and the effect, wherein the one or more software components comprise at least one effect-specific plug-in component adding at least one effect-specific function to an existing application executing on the requesting device; and transcoding the multimedia content utilizing a transcoder external to the cloud computing device in response to the requesting device not being compatible with the multimedia content, wherein the cloud computing device transmits the transcoded multimedia content with the user-specified playback effects incorporated to the requesting device.

2. The method of claim 1, wherein the one or more software components comprise at least one of: a segment of code, a format-specific plug-in, a software upgrade, a software patch, and a software application.

3. The method of claim 2, further comprising:
responsive to the software playback capability of the requesting device being incompatible with the multimedia content and the effect, transmitting the multimedia content with the software component to the requesting device based on the registered device capabilities list.

4. The method of claim 1, wherein the multimedia content is unmodified.

5. The method of claim 1, wherein the multimedia content is transcoded with the corresponding effect incorporated.

6. The method of claim 1, wherein the multimedia content is transmitted to the requesting device with the corresponding effect incorporated without transcoding the multimedia content in response to determining that at least one of the hardware and software capabilities of the requesting device is compatible with the multimedia content.

7. The method of claim 1, wherein the effect comprises at least one user-specified playback effect for the uploaded multimedia content.

8. The method of claim 7, wherein the at least one user-specified playback effect comprises a plurality of playback effects, wherein each of the plurality of playback effects corresponds to a different multimedia file format.

9. The method of claim 1, wherein the effect comprises a plurality of image effects.

10. The method of claim 1, wherein the effect further comprises external data, wherein the external data is merged with the multimedia content during playback of the multimedia content by the requesting device.

11. The method of claim 10, wherein the external data comprises one of: video subtitles, text annotation, captions, and an image mask.

12. The method of claim 10, wherein transmitting the multimedia content to the requesting device comprises transmitting the external data separately from the multimedia content without transcoding the multimedia content.

13. The method of claim 1, wherein receiving the access request from the requesting device comprises:
providing at least one selectable effect to the requesting device from the cloud computing device; and
receiving a selection among the at least one selectable effect.

14. The method of claim 1, wherein the received multimedia content comprises an image file, an audio file, or a video file.

15. The method of claim 1, wherein the software capability corresponds to a version of a playback application executing on the requesting device, wherein the version corresponds to a playback codec utilized by the playback application, and wherein the playback application is configured to receive the one or more software components for expanding a playback capability of the playback application executing on the requesting device.

16. A cloud-based playback system, comprising:
a memory device storing instructions; and
a processor coupled to the memory device and configured by the instructions to at least:
receive information relating to hardware and software playback capabilities from each of a plurality of playback devices, the processor being further configured to construct a device capabilities list, wherein the device capability list is based on the hardware and software playback capabilities, wherein the processor automatically updates the device capabilities list in response to new software being installed on one of the plurality of playback devices, the new software allowing the playback device to support a previously incompatible media format;
receive multimedia content and a corresponding effect uploaded from a source device and store the multimedia content and the corresponding effect;
identify registered devices compatible with the received multimedia content based on the device capabilities list when a requesting device requests access to the multimedia content;
transmit data to the requesting device based on the identification of registered devices compatible with the received multimedia content, wherein the data comprises the multimedia content with the effect incorporated and one or more software components executable on the requesting device, the one or more software components expanding the at least one of the hardware and software playback capabilities of the requesting device with respect to both the multimedia content and the effect, wherein the one or more software components comprise at least one effect-specific plug-in component adding at least one effect-specific function to an existing application executing on the requesting device; and
transmit a transcoding request to a transcoder external to the at least one cloud-based playback system in response to the requesting device not being compatible with the multimedia content and receive transcoded multimedia content with the user-specified playback effects incorporated to the requesting device, wherein the processor transmits the transcoded multimedia content with the user-specified playback effects incorporated to the requesting device.

17. The system of claim 16, wherein the effect comprises one of: information corresponding to at least one user-specified playback effect for the uploaded multimedia content, external data, or any combination thereof, wherein the external data is merged with the multimedia content during playback of the multimedia content by the requesting device.

18. The system of claim 17, wherein the at least one user-specified playback effect comprises a plurality of playback effects, wherein each of the plurality of playback effects corresponds to a different multimedia file format.

19. The system of claim 17, wherein the processor is further configured to transcode the multimedia content in response to the requesting device not being compatible with the multimedia content, wherein the content distributor transmits the transcoded multimedia content with the user-specified playback effects incorporated to the requesting device.

20. The system of claim 17, wherein the wherein the processor transmits the external data separately from the multimedia content to the requesting device.

21. The system of claim 16, wherein the processor is further configured to generate a user interface comprising at least one selectable playback effect.

22. A method implemented in a cloud computing device for facilitating distribution of digital content, comprising:
  receiving information relating to playback capability from a plurality of playback devices communicatively coupled to the cloud computing device;
  registering each of the playback devices and constructing a device capabilities list;
  updating the device capabilities list in response to new software being installed on one of the plurality of playback devices, the new software allowing the playback device to support a previously incompatible media format;
  receiving multimedia content and a corresponding effect uploaded from a source device and storing the multimedia content and the corresponding effect;
  determining a file format of the multimedia content;
  receiving an access request from one of the registered playback devices; and
  in response to the playback capability of the requesting playback device being incompatible with the format of the multimedia content, performing the steps of:
    transmit a transcoding request to a transcoder external to the cloud computing device and receive transcoded multimedia content with the effect incorporated; and
    transmitting, to the requesting playback device, the transcoded version of the multimedia content with the effect incorporated and one or more software components executable on the requesting playback device, the one or more software components expanding the playback capability of the requesting playback device with respect to both the multimedia content and the effect, wherein the one or more software components comprise at least one effect-specific plug-in component adding at least one effect-specific function to an existing application executing on the requesting playback device.

23. The method of claim 22, wherein the effect comprises one of: information corresponding to at least one user-specified playback effect for the uploaded multimedia content, external data, or any combination thereof, wherein the external data is merged with the multimedia content during playback of the multimedia content.

* * * * *